May 28, 1957  B. M. BIRD  2,793,464
ANIMAL TRAP
Filed April 21, 1954  2 Sheets-Sheet 1
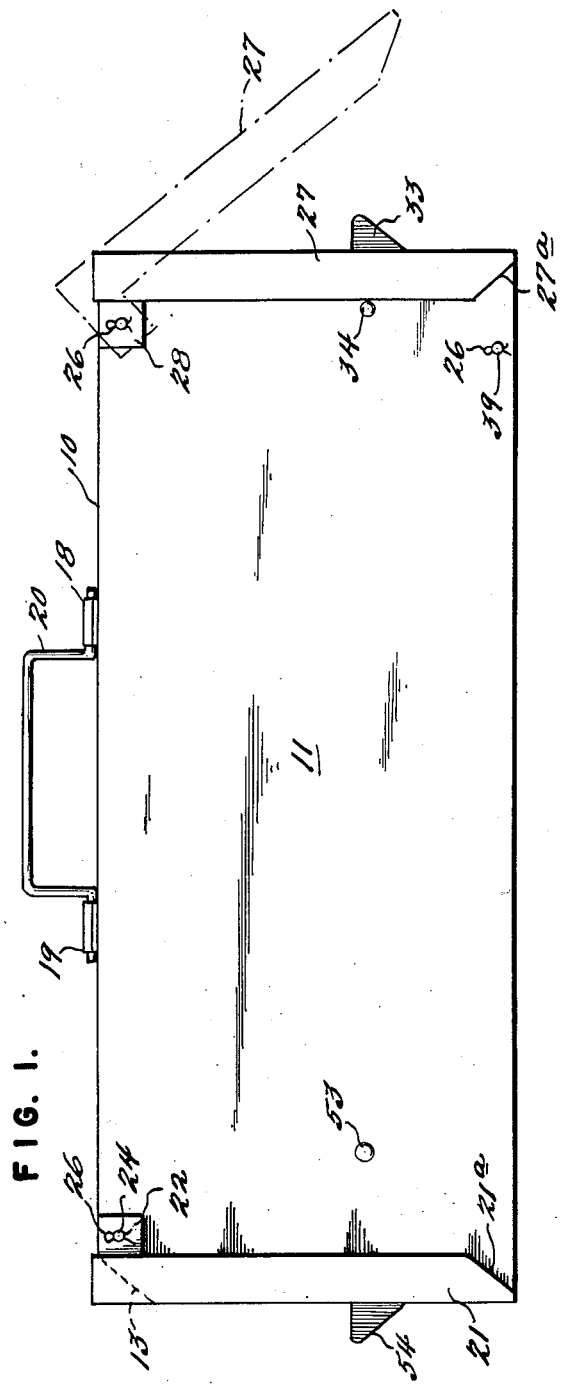
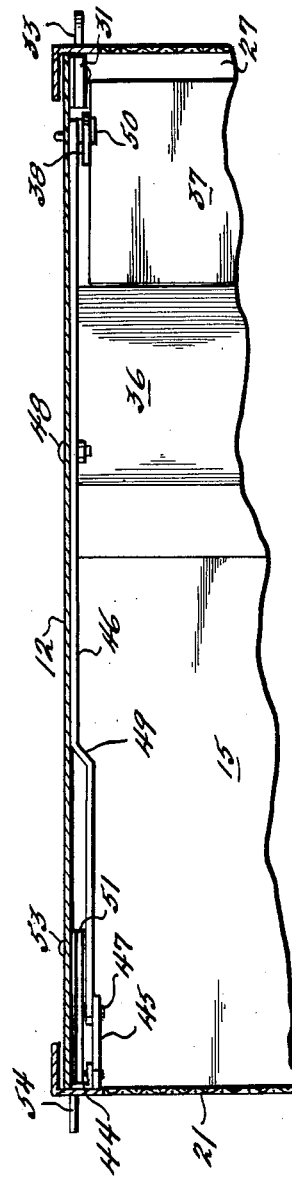
INVENTOR
BENJAMIN M. BIRD
BY
*Semmes & Semmes*
ATTORNEYS May 28, 1957
B. M. BIRD
2,793,464
ANIMAL TRAP
Filed April 21, 1954
2 Sheets-Sheet 2
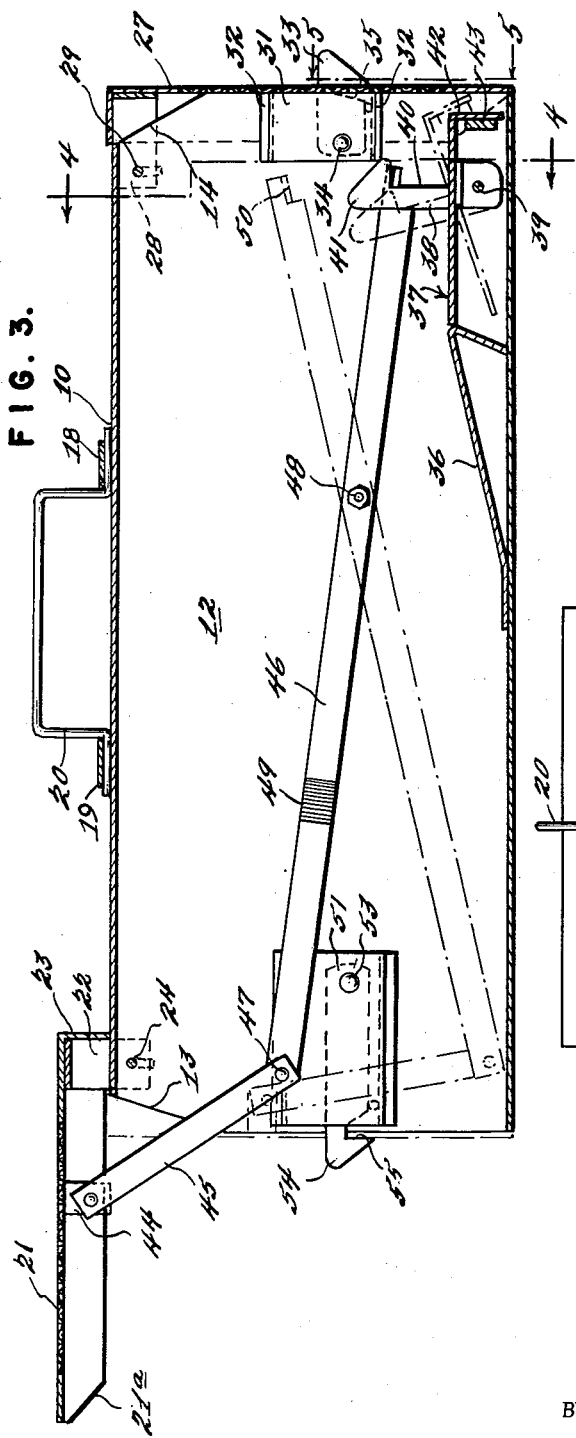
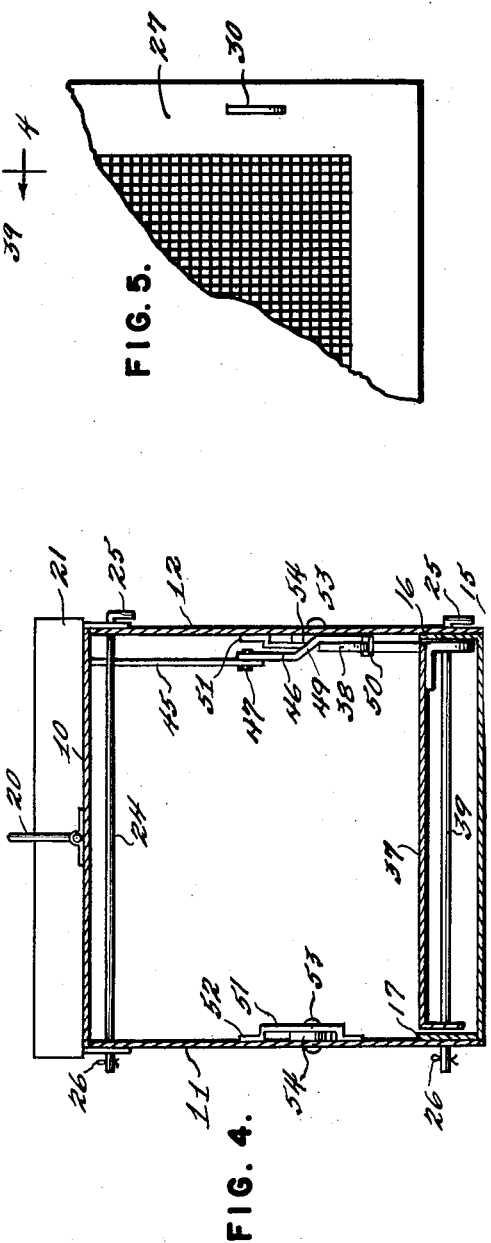
INVENTOR
BENJAMIN M. BIRD
BY *Semmes & Semmes*
ATTORNEYS United States Patent Office 2,793,464
Patented May 28, 1957

2,793,464
ANIMAL TRAP
Benjamin M. Bird, Bowdon, Ga.
Application April 21, 1954, Serial No. 424,598
1 Claim. (Cl. 43—61)

The present invention relates broadly to animal traps and constitutes an improvement of the trap of my previous Patent No. 2,540,418, issued February 6, 1951.

The animal trap of the present invention is of the cage type, provided with a door at one end which is moved to its closed position by the passage of an animal into the trap.

Another object of the present invention is to provide, in such an animal trap, a novel tripping mechanism in conjunction with the front door of the trap.

Another object of the present invention is to provide a cage type trap which when closed resembles an oblong box and which can be constructed in sizes varying in accordance with the size of an animal sought to be captured.

A further object of the present invention is to provide a cage type animal trap which is set by elevating or opening its front door and wherein a door is provided at the other end of the trap for the purpose of facilitating cleaning and baiting of the trap.

Another object of the present invention is to provide a cage type animal trap having a lever assembly on a wall interiorly thereof, and a ramp on the floor of the trap leading to a treadle which operates to close the trap when actuated by an animal's weight.

An additional object of the present invention is to provide a cage type animal trap wherein means are provided for gravity locking of the front door of the trap after being tripped, and in which positive tripping action is provided by a treadle in the interior of the trap.

Another object of the present invention is to provide an animal trap so constructed as not to harm a captured animal.

Additional and further objects and advantages of the present invention will be apparent from the following detailed description of the invention taken together with the accompanying drawings in which:

Fig. 1 is a side elevational view of the animal cage of my present invention, showing a partially opened trap door in dotted lines;

Fig. 2 is a fragmentary sectional plan view of the cage showing in details the tripping release mechanism;

Fig. 3 is a longitudinal sectional view of the trap showing the interior thereof;

Fig. 4 is a sectional view taken on line 4—4 of Fig. 3; and

Fig. 5 is a fragmentary sectional view taken on line 5—5 of Fig. 3.

The body of the cage consists of rectangular integral top 10 and sides 11 and 12. The sides 11 and 12 are arranged at right angles to the top 10. These three members can be formed from a single sheet of material, preferably metal or the like, bent at the desired angles, or if desired the sides can be welded to the top member as will be apparent to those skilled in the art. Triangular portions are removed from the upper corners of the sides 11 and 12 providing the inclined edges 13 and 14. The top 10 is shortened as seen in Fig. 3 so that the narrower edges thereof meet the upper ends of the inclined edges in order to permit the doors to open and close freely as will appear hereinafter.

A U-shaped bottom 15 is provided in which the upstanding sides 16 and 17 are fitted interiorly of the lower edges of the sides 11 and 12 and are secured thereto in any known manner as shown in the lower portion of Fig. 4.

Brackets 18 and 19 secured to the top 10 serve to pivotally mount a handle 20 by which the cage structure can be carried, and when the cage is placed in animal trapping position the handle 20 will fold down onto the top 10 and thereby be out of the way.

A front door generally designated 21 has lateral and rearwardly extending ears 22 at the top thereof for attachment to the body of the cage. The front door 21 as shown also has a top portion 23 to increase the length of the top 10 so as to substantially coincide with that of the sides 11 and 12, as shown in Fig. 3. The ears 22 and the sides 11 and 12 have mating openings therethrough, and through which a rod 24 having one bent end 25 extends. The rod 24 serves to pivotally mount the door 21 to the body of the cage. The bent end 25 serves as an abutment at one end of the rod to prevent its release and at the other end of the rod a cotter pin or the like 26 is inserted through a hole in the rod and thereby preventing dislodgement. In operation the door 21 will pivot about rod 24 into open or closed position.

The rear door 27 likewise has ears at 28 for mounting it on the body of the cage and this door is pivotally mounted by means of a rod 29 passing through openings in the ears and the sides 11 and 12 in a manner similar to the front door 21. Each of the doors 21 and 27 have spaced slots or openings therethrough at 30 as shown in Fig. 5. These permit latching levers to pass therethrough for securing the doors in closed position. A rectangular housing or shield 31 having vertically extending upper and lower flanges 32 is secured to the interior of each side 11 and 12. This housing 31 pivotally mounts a latching member 33 by means of a pivot at 34. This latching member 33 has a beveled nose as shown in Fig. 3 which is adapted to extend through one of the slots 30. The latching member 33 is provided with a downwardly opening notch 35 in the lower edge thereof adapted for coaction with the door. When the door 27 is swung into closed position the nose of latching member 33 will enter the slot 30 and due to its configuration will pivot upwardly to permit passage through the slot 30 until the notch 35 registers with the slot 30, at which time the latching member will fall by gravity into locking position. In order to open the door 27 it is then necessary to manually raise the latching members 33 on the two opposite sides of door 27 as will be understood.

Each of the doors 21, 27 is provided with a wire mesh panel to permit air to enter the cage. The doors also have bevelled lower ends 21a and 27a so that the doors can extend to the bottom of the cage without interference from the ground when closing.

Mounted on the floor of the U-shaped bottom 15 there is a gradually sloping rigid ramp 36 which is held and secured in position in any known manner. This ramp is shown in Fig. 3. A treadle 37 is mounted directly behind the ramp 36. This treadle 37 is secured to a lever arm 38 which is pivotally mounted between the sides 11 and 12 of the cage by means of a pin or rod 39 extending through the base of a lever arm 38 and the two sides 11 and 12 as well as the upstanding sides 16, 17 of bottom 15 in a manner similar to the rod 29. This rod or pin 39 is similar in configuration to the rods 24 and 29.

The lever arm 38 has a vertical groove 40 cut therein intermediate its ends, and the end 41 has a cam shaped nose as shown in Fig. 3 at 41. Depending skirt 42 having a counterweight 43 is formed on the rearward edge of treadle 37 to bias it to horizontal poisition as shown in full lines in Fig. 3. The rod 39 pivotally mounts this treadle on the lever arm.

A lever assembly is secured and pivotally attached to the front door 21 and is operatively associated at the other end thereof with the lever arm 38. A bracket 44 is secured to a side flange of the door 21 and pivotally mounts thereon link 45 as shown in Fig. 3. The link 45 is interconnected with a long lever arm 46 by means of a pivot pin 47. The long lever 46 is pivotally mounted by means of a bolt 48 or the like secured through the side 12. The long lever 46 is angularly offset at 49 to provide clearance for a locking latch at the front door of the cage. The free end of lever 46 has an ear or abutment 50 thereon adapted for coacting with an edge of groove 40 in level arm 38. In Fig. 3 the disposition and arrangement of levers 45 and 46, in conjunction with the ear or lug 50 engaged in the groove 40 in lever 38 is shown when the door is opened, and the trap is set in animal trapping condition. In this position the ear 50 is engaged in the groove 40 and the treadle 37 is in horizontal position. The levers are shown in dotted position in the released and closed position of the door 21, after an animal has tripped the treadle 37 to release the lever arm from the ear 50, whereby the door 21 will swing to closed and trapping position.

Mounted on each side wall 11 and 12, in proximity to the opening for the door 21, there are rectangular housings or shields 51 having flanges 52 secured to the sides by spot-welding, riveting or the like. Pivot pins 53 pivotally mount latching and locking members 54 in each of the housings 51. These latching or locking members 54 have cam-shaped noses at the free ends thereof and spaced rearwardly toward their pivot points are grooves, such as shown at 55, adapted for coaction with slots 30 formed at either side of door 21 in a manner similar to those formed in door 27. When the grooves 55 are engaged and coacting with the edges of the slots 30 in door 21, the door will remain in closed and locked position after an animal has been trapped until the latching members 54 are manually disengaged.

The trap is set by opening door 21 which operates the lever assembly 45, 46 when the lever 40 is locked in the open position of the trap after the ear 50 passes over the cammed end or nose 41 of lever arm 38 the ear 50 will settle at the top of the groove or slot 40. The counterbalancing weight of the treadle 37 will cause the treadle to assume a horizontal position and at the same time the lever arm 38 will assume a vertical position thereby trapping and holding the ear 50 in engagement in the groove. The door is then in open and locked position.

When an animal enters the trap and goes up the ramp 36 toward the bait which may be placed at the rear end of the trap, he will utimately step on the front portion of the treadle 37. When this occurs the treadle 37 will pivot about rod 39 and the lever arm 38 will assume the position shown in dotted lines in Fig. 3. At this point the ear or lug 50 is released from engagement in the groove 40 and, due to its weight the door 21 will close and the levers 45 and 46 will move into the positions shown in dotted lines. The door accordingly closes by gravity when an animal has stepped on the treadle. The door when closed will be locked by means of gravity due to the weight of latching members 54 extending into and through slots 30 in the door.

The rear door, as set forth hereinbefore, is opened only to place the bait in the trap or to clean the trap.

It will be seen that the counter-balance provided on the treadle provides for automatic setting of the trap when the front door is elevated to open position through the force of gravity swinging the lever arm 38 to a vertical position, and that the front door is released from the open and set position by the weight of an animal on the treadle overbalancing the weight thereof to release member 38 from ear 50.

Numerous minor changes in details of construction will be apparent to those skilled in the art to which the present invention pertains without departing from the scope and spirit of the present invention as defined in the appended claim.

I claim:

An animal trap comprising a box having an open end, a door pivotally mounted in proximity to the top of the box adjacent said open end, a lever system mounted in said box on an inner sidewall of said box and connected to said door for maintaining it in an open triggered position, said lever system including a long lever pivotally mounted intermediate its end on said inner sidewall of said box, a short lever pivotally interconnecting an end of said long lever and said door, an offset ear on the free end of said long lever, a pivotally mounted counterbalanced treadle in the bottom of said box, a normally vertical lever arm attached to and pivotable with said treadle and having a groove in a face thereof intermediate its ends, said ear being engageable in said groove to maintain said treadle in a vertical triggered position and disengageable on movement of said treadle to release and permit said door to close, a pointed cam shaped nose on said vertical lever arm and a rounded edge leading into said groove, said ear passing over and around said nose and rounded edge into said groove upon opening said door to trigger said trap.

References Cited in the file of this patent
UNITED STATES PATENTS

| | | |
|---|---|---|
| 154,461 | Dildine | Aug. 25, 1874 |
| 216,287 | Milby | June 10, 1879 |
| 590,019 | Moore | Sept. 14, 1897 |
| 864,200 | Shelton | Aug. 27, 1907 |
| 1,283,232 | Lewis | Oct. 29, 1918 |
| 1,318,246 | Underwood | Oct. 7, 1919 |
| 1,600,347 | Martin | Sept. 21, 1926 |
| 1,741,429 | Orgill | Dec. 21, 1929 |
| 1,842,618 | Mack | Jan. 26, 1932 |
| 1,963,435 | Burnley | June 19, 1934 |
| 2,107,080 | Mitchell | Feb. 1, 1938 |
| 2,540,418 | Bird | Feb. 6, 1951 |